United States Patent [19]
Lin et al.

[11] Patent Number: 5,656,218
[45] Date of Patent: Aug. 12, 1997

[54] METHOD FOR MAKING HIGH PERFORMANCE SELF-REINFORCED SILICON CARBIDE USING A PRESSURELESS SINTERING PROCESS

[75] Inventors: Bor-Wen Lin; Chen-Tsu Fu; Dean-Mo Liu, all of Hsin Chu; Zuei-Chown Jou, Taipei, all of Taiwan

[73] Assignee: Industrial Technology Research Institute, Hsinchu, Taiwan

[21] Appl. No.: 445,238

[22] Filed: May 19, 1995

[51] Int. Cl.$^6$ .............................. C04B 35/64; F27B 9/04
[52] U.S. Cl. .............................. 501/89; 264/656; 264/682
[58] Field of Search .............................. 264/60, 63, 66; 501/89

[56] References Cited

U.S. PATENT DOCUMENTS

| | | | |
|---|---|---|---|
| 4,124,667 | 11/1978 | Coppola et al. | 264/29.5 |
| 4,135,938 | 1/1979 | Murata et al. | 106/44 |
| 4,179,299 | 12/1979 | Coppola et al. | 106/44 |
| 4,230,497 | 10/1980 | Schwetz et al. | 106/44 |
| 4,237,085 | 12/1980 | Smoak | 264/65 |
| 4,354,991 | 10/1982 | Suzuki et al. | 264/65 |
| 4,526,734 | 7/1985 | Enomoto | 264/13 |
| 4,564,490 | 1/1986 | Omori et al. | 264/65 |
| 4,569,921 | 2/1986 | Omori et al. | 501/88 |
| 4,692,418 | 9/1987 | Boecker et al. | 501/90 |
| 4,855,263 | 8/1989 | Kawasaki et al. | 501/92 |
| 4,876,226 | 10/1989 | Fuentes | 501/89 |

FOREIGN PATENT DOCUMENTS

| | | | |
|---|---|---|---|
| 177332 | 11/1990 | Taiwan | C04B 35/56 |

OTHER PUBLICATIONS

Seung Kun Lee, et al., Microstructural Development and Mechanical Properties of Pressureless–Sintered SiC with Plate–Like Grains Using $Al_2O_3$–$Y_2O_3$ Additives/1994.
Do–Hyeong Kim, et al., Toughening Behavior of Silicon Carbide with Additions of Yttria and Alumina/1990.
Mamoru Omori, et al., Preparation of Pressureless–Sintered/1988.

*Primary Examiner*—Christopher A. Fiorilla
*Attorney, Agent, or Firm*—W. Wayne Liauh

[57] ABSTRACT

A sintered silicon carbide (SiC) body prepared by a process which contains the steps of: (a) preparing a raw batch containing: (i) a raw silicon carbide mixture containing about 10 to about 90 weight percent of an α-phase SiC powder and about 90 to about 10 weight percent of a β-phase SiC powder; (ii) aluminum oxide ($Al_2O_3$) powder, about 3 to 15 weight percent of the raw silicon carbide mixture; (iii) yttrium oxide ($Y_2O_3$) powder, about 2 to 10 weight percent of the raw silicon carbide mixture; (iv) an organic binding agent and a dispersing agent; and (v) deionized water; (b) drying the raw batch to form a green body; (c) heating the green body at temperatures between about 400° and 800° C. to remove the organic binding agent and the dispersing agent; and (d) subjecting the green body to a two-stage pressureless sintering process, first at a first sintering temperature between about 1,800° and about 1,950° C. for 0.5 to 8.0 hours, then at a second sintering temperature between about 1,900° and about 2,200° C. for 0.1 to 4 hours, wherein the second sintering temperature is selected such that it is higher than the first sintering temperature. The sintered silicon carbide bodies were measured to have a flexural strength of at least 500 MPa, measured using a four-point method; and a fracture toughness of at least 5.0 MPa-m$^{0.5}$, measured based on a precrack thickness of 0.15 mm.

8 Claims, 3 Drawing Sheets

METHOD FOR MAKING HIGH PERFORMANCE SELF-REINFORCED SILICON CARBIDE USING A PRESSURELESS SINTERING PROCESS

FIELD OF THE INVENTION

The present invention relates to self-reinforced pressureless sintered silicon carbide bodies and the method of making the same. More specifically, the present invention relates to high performance dense silicon carbide bodies that are produced by a self-reinforcing pressureless sintering process, and the method of producing the same. The self-reinforced pressureless sintered silicon carbide bodies of the present invention exhibit substantially improved fracture toughness as well as flexural strength.

BACKGROUND OF THE INVENTION

Due to their high degree of covalent bonding, silicon carbide materials exhibit many superior physical and chemical properties, especially in high temperature structural applications, than many other ceramic materials such as aluminum oxide ($Al_2O_3$), zirconium ($ZrO_2$), and silicon nitride ($Si_3N_4$), etc. These advantageous properties include high hardness and thermal conductivity and excellent thermal shock resistance, hot strength, acid resistance, abrasion resistance, and a high creep limit. Because of these advantageous properties, their applications have been expanded to areas that include the fabrication of mechanical shaft seals, valves, pump linings, shaft bearings, semi-conductor heat treatment tubes, heat exchanger, and various molds for use in steel and other industries. However, silicon carbide materials also suffer from the disadvantages of having relatively low fracture toughness and flexural strength, resulting in inadequate reliability of mechanical components made therefrom. Therefore, it has become highly desirable to improve the toughness as well as the strength of the silicon carbide materials.

Generally, there are two approaches to improve the toughness of silicon carbide. The first approach involves compositing silicon carbide with a fibrous whisker-like crystalline or granularly shaped reinforcing second phase so as to form a reinforced composite. This compositing approach, though has been shown to improve the strength and toughness of silicon carbide, it also introduced many unexpected problems, such as the difficulty to a form dense sintered composite body, the relatively high production cost, and the concern of the cancer-related carcinogenicity associated with some of the reinforcing materials, especially with the extraneous whisker-like crystalline additives.

The second approach involves self-reinforcement. In this approach, beta phase silicon carbide powder is used as a starting material. During the high temperature sintering process, a phase transformation occurs and the beta (cubic) phase silicon carbide will be transformed into a more thermally stable non-cubic hexahedral alpha phase silicon carbide. By carefully controlling the crystal growth process, the hexahedral crystal will be subject to an unequiaxial growth, thus forming elongated plate-like grains resembling the whisker-like structure. However, because the phase change and crystal growth take place in a very rapid pace, the sintering condition must be extremely carefully controlled, and only a very narrow window of sintering temperature and sintering time is allowed. A precipitous decrease in the material strength will be observed if the sintering process is not properly controlled such that plate-like crystals are allowed to grow too long. The self-reinforcement approach is further complicated by the low diffusion coefficient of the silicon carbide material (because of their very high covalent bonding) which requires a very high sintering temperature (greater than 2,000° C.) to obtain dense sintered product.

Because of the low diffusion coefficient of silicon and carbon atoms in the silicon carbide material, it is relatively difficult to achieve dense sintered product using pressureless sintering technique. A number of sintering aids have been disclosed in the prior art so as to obtain high density (greater than 90% of the theoretical limit) sintered silicon carbide products. U.S. Pat. No. 4,124,667 discloses a pressureless sintering process of silicon carbide to produce silicon carbide ceramic bodies by firing shaped bodies, which contain a mixture of silicon carbide, boron carbide, phenolic resin, and a temporary binder, at a sintering temperature of from about 1,900° C. to 2,500° C. The density of the silicon carbide ceramic bodies so produced achieves 75% of the theoretical densities.

U.S. Pat. No. 4,135,938 discloses a dense silicon carbide ceramic body with improved thermal shock resistance which comprises a pressureless sintered composition comprising silicon carbide, and from about 0.3 to about 3.0 weight percent of aluminum diboride.

U.S. Pat. No. 4,179,299 discloses pressureless sintered silicon carbide ceramic bodies which consist essentially of (a) about 91 to 99.85 weight percent, preferably at least 99 weight percent, of silicon carbide, wherein at least 95 percent by weight of the silicon carbide is of the alpha phase; (b) up to about 5.0 weight percent of carbonized organic material; (c) from about 0.15 to about 3.0 percent by weight of boron; and (d) up to about 1.0 percent by weight of additional carbon. The silicon carbide ceramic bodies have at least 90 percent equiaxed microstructure.

U.S. Pat. No. 4,237,085 discloses a method of pressureless sintering a silicon carbide mixture to obtain a sintered, dense product wherein the silicon carbide starting material does not contain a densification aid, such as boron, beryllium or aluminum. The silicon carbide mixture consists essentially of particulate silicon carbide containing less than about 6.0 percent by weight of carbon in the form of elemental carbon or a carbon source material. The sintered silicon carbide products can achieve a density greater than about 85% of the theoretical density.

U.S. Pat. No. 4,564,490 discloses a series of sintered silicon carbide bodies comprising 0.027 to 11.300 atomic percent of sintering assists, which contain one of more members of rare earth (Be, Mg, Ca, Se, or Ba) oxides, and the balance of silicon carbide.

U.S. Pat. No. 4,354,991 discloses a process for producing a dense sintered silicon carbide ceramic body which comprises the steps of first molding a mixture of an oxygen-containing aluminum compound which can be converted into aluminum oxide by heating in a non-oxidative atmosphere at a ratio of 0.5 to 35 weight percent as $Al_2O_3$, with the remaining ceramic material substantially being silicon carbide; then pressureless sintering the mixture in a non-oxidative atmosphere at 1,900° to 2,300° C. The sintered silicon carbide bodies have a flexural strength of at least 25 kg/mm².

U.S. Pat. No. 4,230,497 discloses dense sintered shaped articles of polycrystalline alpha-silicon carbide consisting of (a) at least 95.4 weight percent of alpha-silicon carbide; (b) about 0.1 to 2.0 weight percent of additional carbon; (c) about 0.2 to 2.0 weight percent of aluminum; (d) about 0 to 0.5 weight percent of nitrogen; and (e) about 0 to 0.1 weight percent of oxygen; the alpha-silicon being in the form of a homogeneous microstructure with an average grain size of less than 10 microns. The sintered polycrystalline alpha-silicon carbide bodies have at least 97 percent of their theoretical density.

U.S. Pat. No. 4,855,263 discloses a process for preparing silicon carbide sintered body by adding and mixing powders of silicon carbide having an average grain size of no more than 5 microns with 0.1 to 5 weight percent of magnesium boride and 0.1 to 5 weight percent of carbon or an organic compound producing the same quantity of carbon; shaping the resulting mixture into a predetermined form; and firing the resulting shaped body at a temperature of 1,900° to 2,300° C., under vacuum or in an inert gas atmosphere.

U.S. Pat. No. 4,692,418 discloses a process of making sintered silicon carbide/carbon composite ceramic bodies by firing a microporous shaped green body, which has been infiltrated with an organic material, a sintering aid selected from the group consisting of aluminum, beryllium and boron compounds, silicon carbide having a surface area of from 5 to 100 m$^2$/g, and, optionally a temporary binder, at a sintering temperature of about 1,900° to about 2,300° C. The sintered silicon carbide/carbon composite body has a homogeneous very fine grain microstructure with at least 50 percent of its silicon carbide grains having a size not exceeding about 5 microns and an aspect ratio less than about 3, with graphite grains having an average size not exceeding that of the silicon carbide.

U.S. Pat. No. 4,526,734 discloses a process for producing a sintered silicon carbide body which comprises the steps of (a) preparing a sintering raw material consisting essentially of a substantially non-soluble silicon carbide fine powder and a sintering aid into a dispersion medium selected from the group consisting of benzene, cyclohexane and water, together with a substance selected from the group consisting of a molding assistant and a deflocculating agent; (b) forming a uniform suspension of the sintering raw material; (c) spray freezing the suspension in an atmosphere held at a temperature lower than a melting temperature of the dispersion medium to obtain frozen granulates; (d) free drying the frozen granulates to obtain a powdery dried mixture; (e) shaping the powdery dried mixture into a green body; and (f) shaping the green body with pressing.

In Taiwan Pat. Pub. No. 79109721, it was disclosed a process for preparing silicon carbide bodies having high toughness and fracture resistance comprising the steps of preparing a homogeneous mixture containing about 82 to 99.4 weight percent silicon carbide (primarily of alpha-phase), about 0.5 to 10 weight percent of aluminum nitride, about 0.1 to 8 weight percent of a rare earth oxide, and a temporary binder; and pressureless sintering the mixture at a temperature of about 1,775° to 2,200° C. in an inert environment. The sintered silicon carbide body exhibited a fracture toughness of at least 7 MPa-m$^{1/2}$, measured based on a precrack width of 0.5 mm.

In all the references discussed above, the contents of which are expressly incorporated by reference, although dense sintered silicon carbide bodies can be obtained with its density achieving 95% of the theoretical limit, the sintering temperature must be increased to between 2,000° and 2,500° C. At this high temperature, which causes the silicon carbide grains to experience a rapid anisotropic growth, very long plate-like crystals will likely to be formed. This results in an observable decrease in the strength of the silicon carbide material.

Recently, a number of publications have discussed the use of alumina and yttria, instead of the traditional additives of boron, carbon, aluminum, beryllium, rare earth metals, etc., as sintering aid. In the article entitle "Toughening Behavior of Silicon Cargide with Additions of Yttria and Alumina," J. Am. Ceram. Soc., 73 [5] 1431–34 (1990), Kim et al studied the fracture-toughness mechanism of silicon carbide with additions of yttria ($Y_2O_3$) and alumina ($Al_2O_3$). They reported that significant crack deflection had occurred, and median deflection angles increased with increased volume fractions of the second phase, which was accompanied by increased fracture toughness. The silicon carbide used in their study was alpha-phase silicon carbide.

In U.S. Pat. No. 4,569,921 it is disclosed a process for making sintered silicon carbide moldings by using as a sintering aid a composition comprising oxides of at least one element selected from the group consisting of Sc, Y, La, Ce, Pr, Nd, Sin, Eu, Gd, Tb, Dy, Ho, Er, Tm, Yb, Pm and LU, or at least one element selected from the group consisting of Li, Be, Mg, Si, Ca, Ti, V, Cr, Mn, Fe, Co, Ni, Zn, Sr, Zr, Nb, Mo, Ba, Tc, Tc, W and Th, in addition to the used known sintering aids such as rare earth element oxides, boron oxide and aluminum oxide.

In "Preparation of Pressureless-Sintered SiC-$Y_2O_3$-$Al_2O_3$," J. Materials Science 23 3744–3749 (1988), Omori et al reported that sintering additives prepared from aluminum hydroxide and yttrium hydroxide were soluble in water and resulted in a binder. When a beta-silicon carbide powder was mixed with the sintering additive and sintered at 2,150° C. without pressure, the oxides formed from the additive promoted sintering, and the sintered body contained no pores. Aluminum, silicon, and yttrium oxide were precipitated in the sintered body. The bulk density and flexural strength of the sintered silicon carbide bodies were 3.11 g/cm$^3$ and 470 MPa, respectively.

More recently, in an article entitled "Microstructural Development and Mechanical Properties of Pressureless-Sintered SiC with Plate-Like Grains Using $Al_2O_3$-$Y_2O_3$ Additives," Lee et al reported that dense SiC ceramics with plate-like grains were obtained by pressureless sintering using beta-SiC powder with the addition of 6 weight percent $Al_2O_3$ and 4 weight percent $Y_2O_3$. It was reported that during the sintering of the beta-SiC powder compact, the equiaxed grain structure gradually changed into the plate-like grain structure that is closely entangled and linked together through the grain growth associated with the beta-alpha transformation. With increased holding time, the extent of the beta-to-alpha phase transformation, the grain size, and the aspect of grains, increased, and the fractured toughness increased from 4.5 MPa-m$^{1/2}$ to 8.3 MPa-m$^{1/2}$. It was concluded that the crack deflection and crack bridging were considered to be the main operative mechanisms that led to the improved fracture toughness.

In the sintering processes discussed above, the contents of which are expressly incorporated by reference, the sintering temperature can be reduced to between 1,800° and 2,000° C. while achieving the goal of obtaining a dense sintered product. The lowered sintering temperature also helped controlling the crystal growth to as to limit the length of the plate-like crystals to less than about 15 microns, thus improving the fracture toughness of the sintered product. However and unfortunately, the predominance of the presence of the metallic plate-like crystalline structure also adversely affects the flexural strength of the sintered products. Thus, it remains to be developed a process which can simultaneously improve both the fracture toughness and the flexural strength of the silicon carbide material, while maintaining a high density of the sintered product and confining the sintering process under a pressureless condition.

SUMMARY OF THE INVENTION

The primary object of the present invention is to develop a pressureless (i.e., no pressure is applied) sintering method for producing self-reinforced sintered silicon carbide bodies. More specifically, the primary object of the present invention is to develop a pressureless sintering method, which involves a novel sintering composition and a novel two-stage sintering process, for producing high performance dense silicon carbide bodies which exhibit improved fracture toughness and flexural strength, while retaining a sintered density of at least 94.5% of the theoretical limit.

In the process disclosed in the present invention, a raw sintering composition is first prepared which comprises:

(a) a silicon carbide mixture containing about 10 to about 90 weight percent of α-phase SiC powder and about 90 to about 10 weight percent of β-phase SiC powder;

(b) aluminum oxide ($Al_2O_3$) powder, about 3 to 15 weight percent of the silicon carbide mixture;

(c) yttrium oxide ($Y_2O_3$) powder, about 2 to 10 weight percent of the silicon carbide mixture;

(d) a temporary binding agent and a dispersing agent; and (e) de-ionized water.

The α-phase SiC powder should have a grain size preferably in the range between 0.1 and 5.0 μm; the β-phase SiC powder should have a grain size preferably in the range between 0.01 and 3.0 μm; and the $Al_2O_3$ and $Y_2O_3$ powders should have a grain size preferably in the range between 0.1 and 3.0 μm. The amount of the $Al_2O_3$ and $Y_2O_3$ powders to be used in the sintering composition ranges between about 5 and about 25 weight percent, preferably between about 5 and 20 weight percent, of the sum of the α-phase and the β-phase SiC powders. The solid content of the sintering composition is between about 35 and about 65 weight percent.

In the process disclosed in the present invention, the sintering composition is thoroughly mixed for 48 hours and degassed to form a slurry, which is then placed inside a mold and dried to form a shaped green body. The green body, which has a density of about 60% of the theoretical limit, is heated to a temperature between about 400° and 800° C. to remove the organic additives (i.e., the binder and the dispersing agent). Thereafter, the green body is subject to a two-stage pressureless sintering process, first at a first sintering temperature between about 1,800° and about 1,950° C. for 0.5 to 8.0 hours, then at a second sintering temperature between about 1,900° and about 2,200° C. for 0.1 to 4 hours. The second sintering temperature will be selected such that it will be higher than the first sintering temperature. The first sintering step causes the silicon carbide green body to become densified; whereas, the second sintering step promotes the growth of the silicon carbide crystal into a plate-like shape. The sintering is conducted in a vacuum or under a protective (i.e., inert or reducing) sintering atmosphere. The protective atmosphere can be provided by an inert gas, such as argon, nitrogen, or a reducing gas such as hydrogen, or a mixture thereof.

Alternatively, the present invention also discloses a series of high performance self-reinforced pressureless sintered silicon carbide bodies, which are made from a raw sintering composition that contains:

(a) a silicon carbide mixture containing about 10 to about 90 weight percent α-phase SiC powder and about 90 to about 10 weight percent β-phase SiC powder;

(b) aluminum oxide ($Al_2O_3$) powder, about 3 to 15 weight percent of the silicon carbide mixture; and (c) yttrium oxide ($Y_2O_3$) powder, about 2 to 10 weight percent of the silicon carbide mixture.

The self-reinforced sintered silicon carbide composites disclosed in the present invention have been shown to exhibit both superior fracture toughness and superior flexural strength relative to those disclosed in the prior art. Their microstructure comprises both an equiaxial grain microstructure, with an average grain size less than 5 microns, and an elongated plate-like grain microstructure, with an average length less than 20 microns and an average width less than 3 microns.

BRIEF DESCRIPTION OF THE DRAWING

The present invention will be described in detail with reference to the drawings showing the preferred embodiment of the present invention, wherein.

DETAILED DESCRIPTION OF THE PREFERRED EMBODIMENT

The present invention primarily discloses a pressureless sintering method for producing self-reinforced sintered silicon carbide bodies. The process disclosed in the present invention involves the preparation of a novel sintering composition and using a novel two-stage sintering process for producing high performance dense silicon carbide bodies which exhibit superior fracture toughness and flexural strength.

Figure 1:
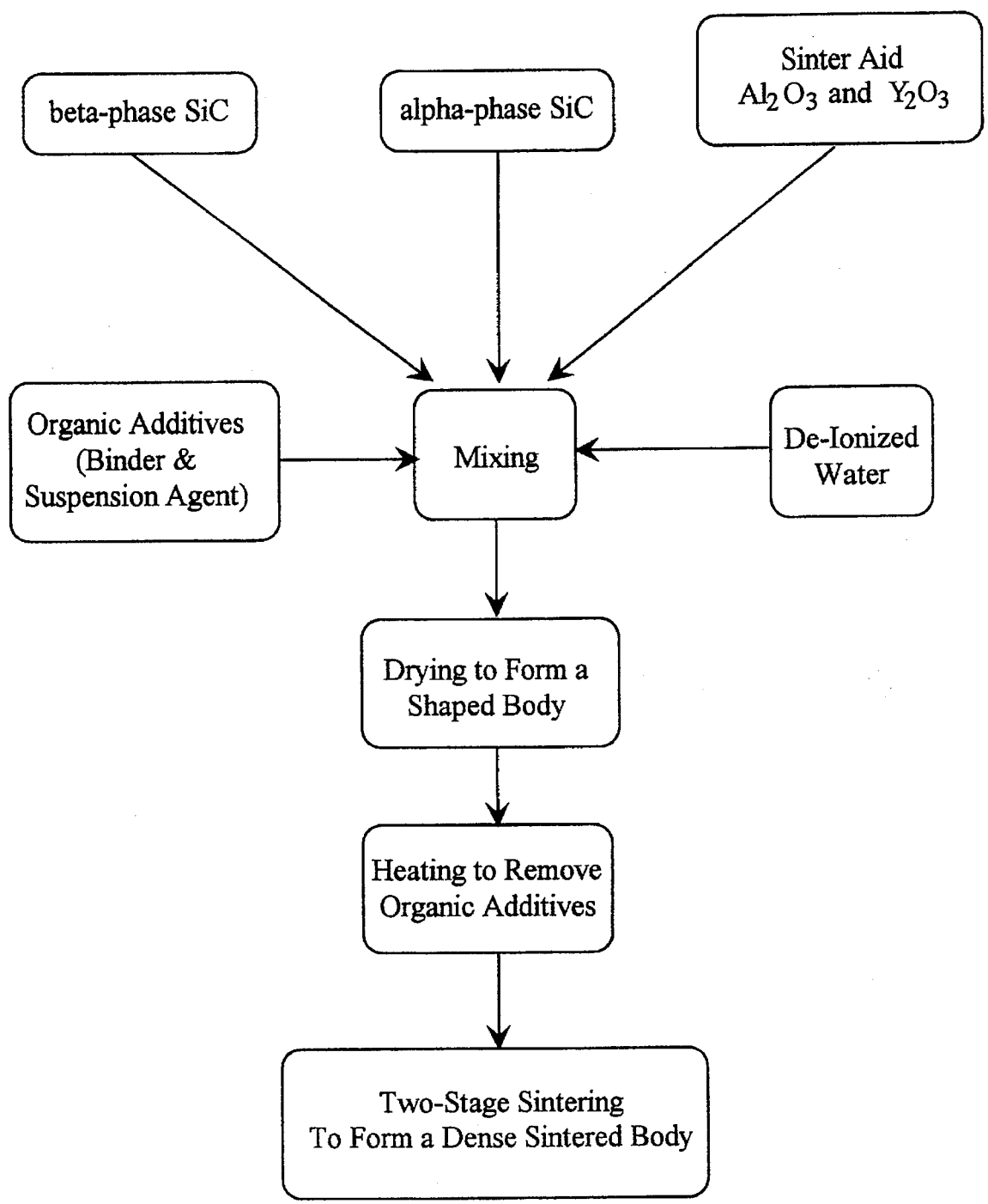
FIG. 1 is a schematic drawing showing the steps of the two-stage sintering process disclosed in the present invention for making self-reinforced pressureless sintered silicon carbide bodies.

FIG. 1 is a schematic drawing showing the steps of the two-stage sintering process disclosed in the present invention for making self-reinforced pressureless sintered silicon carbide bodies. In the process disclosed in the present invention, a sintering composition is first prepared which comprises: (a) a silicon carbide mixture containing about 10 to about 90 weight percent of an α-phase SiC powder and about 90 to about 10 weight percent of a β-phase SiC powder; (b) aluminum oxide ($Al_2O_3$) powder, about 3 to 15 weight percent of the silicon carbide mixture; (c) yttrium oxide ($Y_2O_3$) powder, about 2 to 10 weight percent of the silicon carbide mixture; (d) a temporary binding agent and a dispersing agent; and (e) de-ionized water. The α-phase SiC powder should have a grain size preferably in the range between 0.1 and 5.0 μm; the β-phase SiC powder should have a grain size preferably in the range between 0.01 and 3.0 μm; and the $Al_2O_3$ and $Y_2O_3$ powders should have a grain size preferably in the range between 0.1 and 3.0 μm. The amount of the $Al_2O_3$ and $Y_2O_3$ powders to be used in the sintering composition ranges between about 5 and about 25 weight percent of the sum of the α-phase and the β-phase SiC powders. The solid content of the sintering composition is between about 35 and about 65 weight percent.

In the process disclosed in the present invention, the sintering composition is thoroughly mixed for 48 hours and degassed to form a slurry, which is then placed inside a mold and dried to form a shaped green body. The green body, which has a density of about 60% of the theoretical density, is heated to a temperature between about 400° and 800° C. to remove the organic additives (i.e., the organic binder and the dispersing agent). Thereafter, the green body is subject to a two-stage pressureless sintering process, first at a first sintering temperature between about 1,800° and about 1,950° C. for 0.5 to 8.0 hours, then at a second sintering temperature between about 1,900° and about 2,200° C. for 0.1 to 4 hours. The second sintering temperature is selected such that it will be higher than the first sintering temperature. The first sintering step causes the silicon carbide green body to become densified; whereas, the second sintering step promotes the growth of the silicon carbide crystal into a plate-like shape. The sintering can be conducted in a vacuum or under a protective (i.e., inert or reducing) environment. In a preferred embodiment, the sintering is conducted in a vacuum environment when the sintering temperature is below 1,200° C. Above, 1,200, then it is switched to a protective sintering atmosphere. The protective atmosphere can be provided by an inert gas, such as argon, nitrogen, or a reducing gas such as hydrogen, or a mixture thereof.

SEM results conducted on the self-reinforced sintered silicon carbide composites prepared in accordance with the process disclosed in the present invention revealed that their microstructure comprises both an equiaxial grain microstructure with an average grain size less than 5 microns, and an elongated plate-like grain microstructure with an average length less than 20 microns and an average width less than 3 microns. The sintered bodies of the present invention provided a sintered density of at least 94.5% of their theoretical density, and exhibited superior fracture toughness and flexural strength relative to those disclosed in the prior art.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

A raw sintering composition was prepared which contained 100 wt % α-phase silicon carbide powder, aluminum oxide ($Al_2O_3$) powder, and yttrium oxide ($Y_2O_2$) powder. The amounts of aluminum oxide and yttrium oxide powders were 6.2 wt % and 3.8 wt %, respectively, of the weight of the silicon carbide powder. The average grain sizes for the α-phase silicon carbide powder, aluminum oxide powder, and yttrium oxide powder were 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of about 60% of the theoretical density.

The silicon carbide green body was heated to 400° to 800° C. to remove the organic additives including the binder and the dispersing agent. Thereafter, it was placed inside an oven at a sintering temperature of 1,900° C. for two hours. The sintering environment was maintained either in a vacuum or under a protective environment. After the sintered silicon carbide body was removed from the oven and cooled, its density, flexural strength and fracture toughness were measured to be 97.9% (of theoretical), 473 MPa, and 4.88 MPa-m$^{0.5}$, respectively, and the results are summarized in Table 1. The flexural strength and fracture toughness were measured by first grinding the surface of the sintered body with a 600 mesh diamond wheel, and machining the sintered body into 3×4×40 mm specimen. The flexural strength was measured in accordance with the four-point method. In the fracture toughness tests, a precrack of about 1.3 mm deep was formed on the tensile-stressed surface of a test specimen using a 0.15 mm thick diamond blade. A single-edge-notched-beam method was then used to evaluate the fracture toughness of the specimens. Each of these tests involved six identically prepared specimens, and their average test results were reported.

EXAMPLE 2

The procedure in Example 1 was identical to that in Example 2, except that the raw sintering composition was prepared which contained 100 wt % β-phase silicon carbide powder, aluminum oxide ($Al_2O_3$) powder, and yttrium oxide ($Y_2O_3$) powder. The amounts of aluminum oxide and yttrium oxide powders were also 6.2 wt % and 3.8 wt %, respectively, of the weight of the β-phase silicon carbide powder. After the sintered silicon carbide body was prepared in the same procedure as that described in Example 1, its density, flexural strength and fracture toughness were measured to be 94.9% (of theoretical), 369 MPa, and 4.44 MPa-m$^{0.5}$, respectively, and the results are summarized in Table 1.

EXAMPLE 3

A silicon carbide mixture was prepared which contained 90 wt % α-phase silicon carbide powder and 10 wt % β-phase silicon carbide powder. A raw sintering composition was then prepared which contained the silicon carbide powder mixture so prepared, aluminum oxide powder, and yttrium oxide powder. The amounts of aluminum oxide and yttrium oxide powders were 6.2 wt % and 3.8 wt %, respectively, of the weight of the silicon carbide powder mixture. The average grain sizes for the α-phase and β-phase silicon carbide powders, aluminum oxide powder, and yttrium oxide ($Y_2O_3$) powder were 0.5 microns, 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of 60% of the theoretical density.

The silicon carbide green body was heated to 400° to 800° C. to remove the organic additives including the binder and the dispersing agent. Thereafter, it was placed inside an oven at a sintering temperature of 1,900° C. for two hours. The sintering environment was maintained either under vacuum under an inert or reducing environment. After the sintered silicon carbide body was removed from the oven and cooled, its density, flexural strength and fracture toughness were measured to be 96.5% (of theoretical), 463 MPa, and 4.97 MPa-m$^{0.5}$, respectively, and the results are summarized in Table 1.

EXAMPLE 4

The procedure in Example 4 was identical to that in Example 3, except that silicon carbide mixture contained 70 wt % α-phase silicon carbide powder and 30 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 3, its density, flexural strength and fracture toughness were measured to be 96.4% (of theoretical), 485 MPa, and 4.98 MPa-m$^{0.5}$, respectively, and the results are summarized in Table 1.

EXAMPLE 5

The procedure in Example 5 was identical to that in Example 3, except that silicon carbide mixture contained 30 wt % α-phase silicon carbide powder and 70 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 3, its density, flexural strength and fracture toughness were measured to be 97.3% (of theoretical), 440 MPa, and 5.05 MPa-m$^{0.5}$, respectively, and the results are summarized in Table 1.

EXAMPLE 6

The procedure in Example 6 was identical to that in Example 3, except that silicon carbide mixture contained 10 wt % α-phase silicon carbide powder and 90 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 3, its density, flexural strength and fracture toughness were measured to be 95.4% (of theoretical), 355 MPa, and 4.80 MPa-m$^{0.5}$, respectively, and the results are summarized in Table 1.

By comparing the results from Examples 1 and 2 with those from Examples 3–6, it can be shown that by using the α-phase and β-phase silicon carbide powder mixture, the flexural strength and the fracture toughness were improved.

EXAMPLE 7

A raw sintering composition was prepared which contained 100 wt % α-phase silicon carbide powder, aluminum oxide powder, and yttrium oxide powder. The amounts of aluminum oxide and yttrium oxide powders were 6.2 wt % and 3.8 wt %, respectively, of the weight of the silicon carbide powder. The average grain sizes for the α-phase silicon carbide powder, aluminum oxide powder, and yttrium oxide powder were 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of 60% of the theoretical density.

Figure 2A:
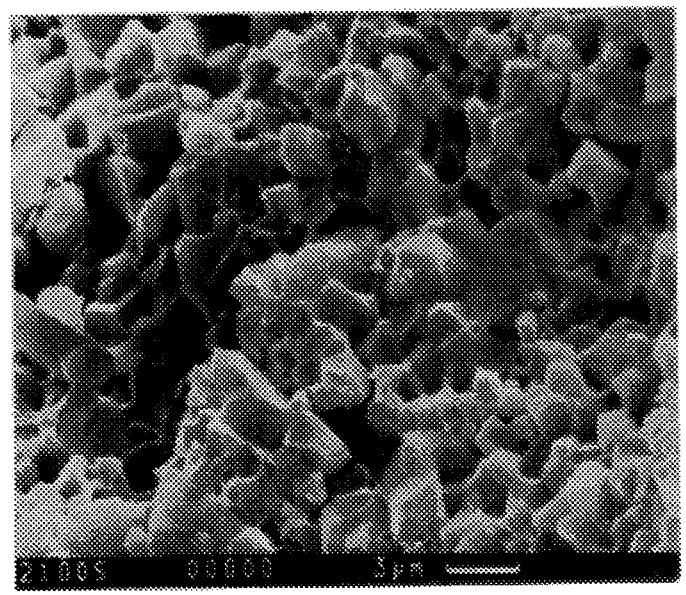
FIG. 2A is an SEM picture of a sintered silicon carbide body prepared from pure α-phase silicon carbide powder.

The silicon carbide green body was heated to 400° to 800° C. to remove the organic additives including the binder and the dispersing agent. Thereafter, it was placed inside an oven and subject to a two-stage sintering treatment. During the two-stage sintering treatment, the silicon carbide green body was sintered at a first sintering temperature of 1,900° C. for two hours, then at a second sintering temperature of 2,000° C. for 0.5 hours. The sintering environment was maintained under vacuum or an inert or reducing environment. After the sintered silicon carbide body was removed from the oven and cooled, its density, flexural strength and fracture toughness were measured to be 99.1% (of theoretical), 423 MPa, and 5.02 MPa-m$^{0.5}$, respectively, and the results are summarized in Table 1. Additionally, FIG. 2A is provided which shows a scanning electromagnetic photograph of the sintered body prepared from the pure α-phase silicon carbide powder. The microstructure of the sintered silicon carbide body comprises predominately equiaxial microstructures having a average grain size of about 2.5 microns.

EXAMPLE 8

Figure 2B:
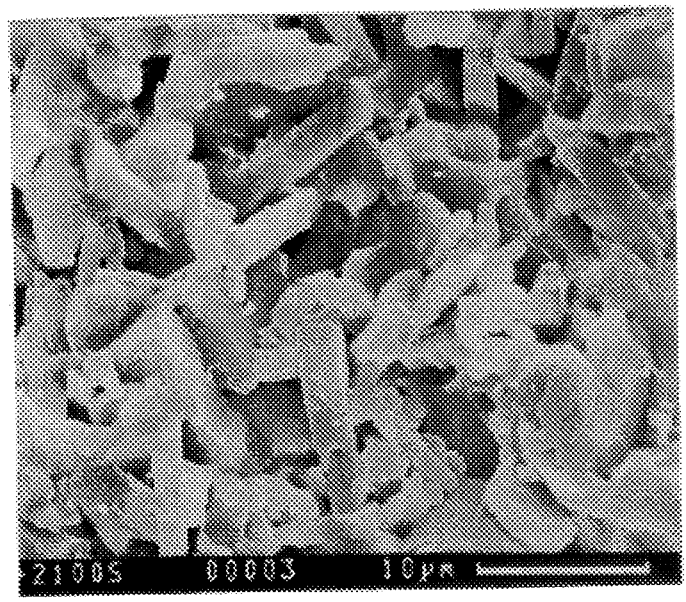
FIG. 2B is an SEM picture of a sintered silicon carbide body prepared from pure β-phase silicon carbide powder.

The procedure in Example 8 was identical to that in Example 7, except that the raw sintering composition was prepared which contained 100 wt % β-phase silicon carbide powder, aluminum oxide powder, and yttrium oxide powder. The amounts of aluminum oxide and yttrium oxide powders were also 6.2 wt % and 3.8 wt %, respectively, of the weight of the β-phase silicon carbide powder. After the sintered silicon carbide body was prepared in the same procedure as that described in Example 1, its density and flexural strength were measured to be 98.4% (of theoretical), and 491 MPa, respectively, and the results are summarized in Table 1. FIG. 2B is provided which shows an SEM picture of the sintered body prepared from the pure β-phase silicon carbide powder. With the two-stage sintering process, the length of the elongated plate-like microstructure was less than 12 microns, and its width was less than 6 microns.

EXAMPLE 9

A silicon carbide mixture was prepared which contained 90 wt % α-phase silicon carbide powder and 10 wt % β-phase silicon carbide powder. A raw sintering composition was then prepared which contained the silicon carbide powder mixture so prepared, aluminum oxide powder, and yttrium oxide powder. The amounts of aluminum oxide and yttrium oxide powders were 6.2 wt % and 3.8 wt %, respectively, of the weight of the silicon carbide powder mixture. The average grain sizes for the α-phase and β-phase silicon carbide powders, aluminum oxide powder, and yttrium oxide ($Y_2O_3$) powder were 0.5 microns, 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of 60% of the theoretical density.

The silicon carbide green body was heated to 400° to 800° C. to remove the organic additives including the binder and the dispersing agent. Thereafter, it was placed inside an oven and subject to a two-stage sintering treatment. During the two-stage sintering treatment, the silicon carbide green body was sintered at a first sintering temperature of 1,900° C. for two hours, then at a second sintering temperature of 2,000° C. for 0.5 hours under vacuum or a protective (inert or reducing) environment. After the sintered silicon carbide body was removed from the oven and cooled, its density, flexural strength and fracture toughness were measured to be 98.9% (of theoretical), 538 MPa, and 5.04 MPa-m$^{0.5}$, respectively, and the results are summarized in Table 1.

EXAMPLE 10

The procedure in Example 10 was identical to that in Example 9, except that silicon carbide mixture contained 70 wt % α-phase silicon carbide powder and 30 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 9, its density, flexural strength and fracture toughness were measured to be 99.1% (of theoretical), 600 MPa, and 5.35 MPa-m$^{0.5}$, respectively, and the results are summarized in Table 1.

EXAMPLE 11

The procedure in Example 11 was identical to that in Example 9, except that silicon carbide mixture contained 30 wt % α-phase silicon carbide powder and 70 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 9, its density, flexural strength and fracture toughness were measured to be 99.1% (of theoretical), 532 MPa, and 5.31 MPa-m$^{0.5}$, respectively, and the results are summarized in Table 1.

Figure 2C:
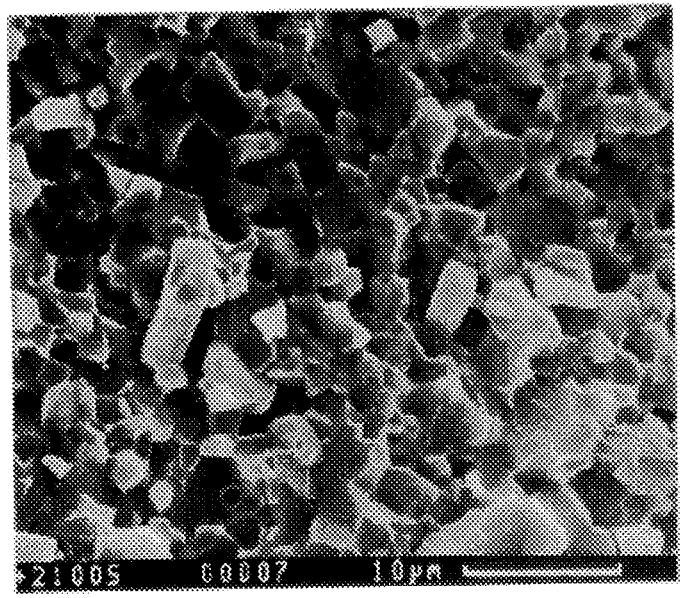
FIG. 2C is an SEM picture of a sintered silicon carbide body prepared from a preferred embodiment of the sintering composition disclosed in the present invention.
Figure 3:
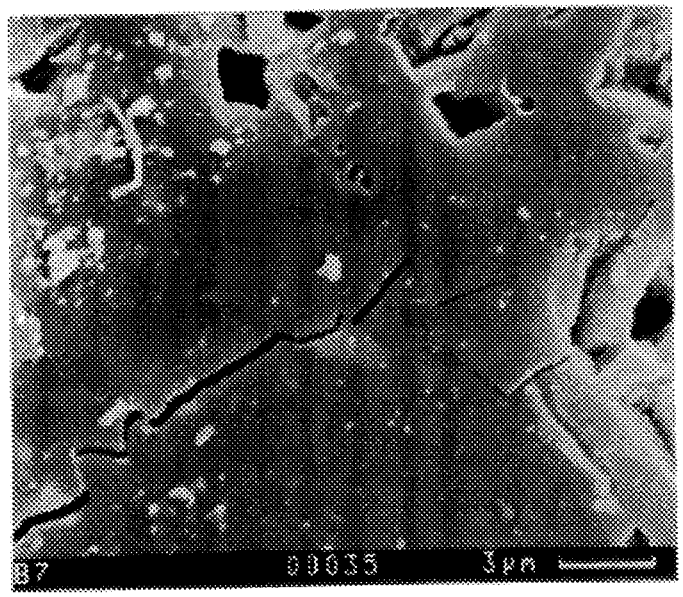
FIG. 3 is an SEM picture of a sintered silicon carbide body prepared from a preferred embodiment of the sintering composition disclosed in the present invention, showing the termination in the propagation of the micro-fractures as a result of the crack-deflection and crack-bridging actions provided by the elongated plate-like crystalline structure.

FIG. 2C is provided which shows an SEM picture of the sintered body prepared from this example. The SEM picture shows a mixture of the equiaxial microstructure and the elongated plate-like microstructure. The elongated plate-like microstructure observed in FIG. 2C resembles a whisker-like microstructure, which is typically provided in the reinforced silicon carbide composites. Thus, the present invention was able to provide self-reinforcement without the use of a foreign material. FIG. 3 is a further magnified SEM picture of the sintered body as shown in FIG. 2C; it demonstrates the stoppage in the propagation of the microfractures as a result of the deflection and bridging actions provided by the elongated plate-like crystalline structure.

EXAMPLE 12

The procedure in Example 12 was identical to that in Example 9, except that silicon carbide mixture contained 10 wt % α-phase silicon carbide powder and 90 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 9, its density and flexural strength were measured to be 98.6% (of theoretical) and 573 MPa, respectively, and the results are summarized in Table 1.

The test results from Examples 9 through 12 clearly indicated that outstanding improvements can be obtained by using a mixture of the α-phase and β-phase silicon carbide powder mixture, coupled with the two-stage sintering process disclosed in the present invention. Best results were obtained when the ratio between the α-phase and β-phase silicon carbide powders was 70/30, by weight.

EXAMPLE 13

A raw sintering composition was prepared which contained 100 wt % α-phase silicon carbide powder, aluminum oxide powder, and yttrium oxide powder. The amounts of aluminum oxide and yttrium oxide powders were 6.2 wt % and 3.8 wt %, respectively, of the weight of the silicon carbide powder. The average grain sizes for the α-phase silicon carbide powder, aluminum oxide powder, and yttrium oxide powder were 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of 60% of the theoretical density.

The silicon carbide green body was heated to 400° to 800° C. to remove the organic additives including the binder and the dispersing agent. Thereafter, it was placed inside an oven and subject to a two-stage sintering treatment. During the two-stage sintering treatment, the silicon carbide green body was sintered at a first sintering temperature of 1,900° C. for two hours, then at a second sintering temperature of 2,050° C. for 0.5 hours. The sintering environment was maintained under vacuum or a protective (inert or reducing) environment. After the sintered silicon carbide body was removed from the oven and cooled, its density and fracture toughness were measured to be 98.9% (of theoretical) and 5.19 MPa-m$^{0.5}$, respectively, and the results are summarized in Table 1.

EXAMPLE 14

The procedure in Example 14 was identical to that in Example 13, except that the raw sintering composition was prepared which contained 100 wt % β-phase silicon carbide powder, aluminum oxide powder, and yttrium oxide powder. The amounts of aluminum oxide and yttrium oxide powders were also 6.2 wt % and 3.8 wt %, respectively, of the weight of the β-phase silicon carbide powder. After the sintered silicon carbide body was prepared in the same procedure as that described in Example 13, its density, flexural strength and fracture toughness were measured to be 97.8% (of theoretical), 432 MPa, and 4.14 MPa-m$^{0.5}$, respectively, and the results are summarized in Table 1.

EXAMPLE 15

A silicon carbide mixture was prepared which contained 90 wt % α-phase silicon carbide powder and 10 wt % β-phase silicon carbide powder. A raw sintefmg composition was then prepared which contained the silicon carbide powder mixture so prepared, aluminum oxide powder, and yttrium oxide powder. The amounts of aluminum oxide and yttrium oxide powders were 6.2 wt % and 3.8 wt %, respectively, of the weight of the silicon carbide powder mixture. The average grain sizes for the α-phase and β-phase silicon carbide powders, aluminum oxide powder, and yttrium oxide powder were 0.5 microns, 0.5 microns, 0.6 microns, and 3 microns, respectively. The raw sintering composition was added with an appropriate binder and a dispersing agent and was throughly mixed for 48 hours to form a homogeneous slurry. After degassing, the homogeneous slurry was cast into a gypsum mold, inside which the slurry was dried to form a 60×60×7 mm green body. The green body was measured to have a density of 60% of the theoretical density.

The silicon carbide green body was heated to 400° to 800° C. to remove the organic additives including the binder and the dispersing agent. Thereafter, it was placed inside an oven and subject to a two-stage sintering treatment. During the two-stage sintering treatment, the silicon carbide green body was sintered at a first sintering temperature of 1,900° C. for two hours, then at a second sintering temperature of 2,050° C. for 0.5 hours. The sintering environment was maintained under vacuum or a protective (inert or reducing) environment. After the sintered silicon carbide body was removed from the oven and cooled, its density, flexural strength and fracture toughness were measured to be 98.8% (of theoretical), 499 MPa, and 4.93 MPa-m$^{0.5}$, respectively, and the results are summarized in Table 1.

EXAMPLE 16

The procedure in Example 16 was identical to that in Example 15, except that silicon carbide mixture contained 70 wt % α-phase silicon carbide powder and 30 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 15, its density and flexural strength were measured to be 99.0 % (of theoretical) and 562 MPa, respectively, and the results are summarized in Table 1.

EXAMPLE 17

The procedure in Example 17 was identical to that in Example 15, except that silicon carbide mixture contained 30 wt % α-phase silicon carbide powder and 70 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 15, its density was measured to be 98.7% (of theoretical), and the result is summarized in Table 1.

EXAMPLE 18

The procedure in Example 12 was identical to that in Example 15, except that silicon carbide mixture contained 10 wt % α-phase silicon carbide powder and 90 wt % β-phase silicon carbide powder. The amounts of aluminum oxide and yttrium oxide powders were also 6.2 wt % and 3.8 wt %, respectively, of the weight of the silicon carbide powder mixture. After the sintered silicon carbide body was prepared in the same procedure as that described in Example 15, its density and fracture toughness were measured to be 98.7% (of theoretical) and 5.17 MPa-m$^{0.5}$, respectively, and the results are summarized in Table 1.

The test results from Examples 13 through 18 also clearly manifested that outstanding improvements obtained using the novel process disclosed in the present invention.

EXAMPLES 19 THROUGH 24

The procedures in Examples 19 through 24 were identical to those described in Examples 13 through 18, respectively, except that, during the two-stage sintering treatment, the silicon carbide green body was sintered at a first sintering temperature of 1,900° C. for two hours, then at a second sintering temperature of 2,100° C. for 0.5 hours. After the sintered silicon carbide bodies were prepared their density and fracture toughness were measured and the results are summarized in Table 1. All the test results again demonstrated the outstanding improvements obtained using the novel process disclosed in the present invention. The measured densities (as percent of the theoretical density) from Examples 19–24 were 98.5%, 95.3%, 98.3%, 98.2%, 97.7%, and 97.0%, respectively; the measured flexural strengths were 383, 493, 533, 547, 507, and 542 MPa, respectively; and the measured fracture toughnesses were 5.46, 5.95, 6.04, 5.90, and 5.67, respectively (fracture toughness of Example 19 was not measured).

The measured fracture toughness for the silicon carbide body prepared in Example 22 (70 wt % α-phase silicon carbide powder and 30 wt % β-phase silicon carbide) was 6.04 MPa-m$^{0.5}$. The fracture toughness was measured based on a precrack width of 0.15 mm. Since the apparent (i.e., measured) fracture toughness is proportional to the precrack width (and only the fracture toughness measured based on a very narrow precrack width will be closer to the true fracture toughness), this value would translate to an apparent fracture toughness of at least 9.3 MPa-m$^{0.5}$, if it were measured based on a fractured width of 0.5 mm.

EXAMPLES 25 THROUGH 30

The procedures in Examples 25 through 30 were identical to those described in Examples 13 through 18, respectively, except that, during the two-stage sintering treatment, the silicon carbide green body was sintered at a first sintering temperature of 1,900° C. for two hours, then at a second sintering temperature of 2,150° C. for 0.5 hours. After the sintered silicon carbide bodies were prepared their density and fracture toughness were measured and the results are summarized in Table 1. The measured densities (as percent of the theoretical limit) from Examples 25–30 were 97.6%, 93.6%, 97.9%, 97.6%, 97.2%, and 96.3%, respectively; the measured flexural strengths were 410, 415, 537, 532, and 499 MPa, respectively (flexural strength of Example 30 was not measured); and the measured fracture toughnesses were 5.03, 4.64, 5.28, 6.02, 5.86, and 5.10, respectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Example No. | α-SiC/β-SiC | Sintering Temp. (°C.) | Sintering Time (Hr.) | Sintered Density (%) | Flexural Strength (MPa) | Fracture Toughness (MPa-m$^{0.5}$) |
|---|---|---|---|---|---|---|
| 1 | 100/0 | 1900 | 2 | 97.9 | 473 | 4.88 |
| 2 | 0/100 | 1900 | 2 | 94.9 | 369 | 4.44 |
| 3 | 90/10 | 1900 | 2 | 96.5 | 463 | 4.97 |

TABLE 1-continued

| Example No. | α-SiC/β-SiC | Sintering Temp. (°C.) | Sintering Time (Hr.) | Sintered Density (%) | Flexural Strength (MPa) | Fracture Toughness (MPa-m$^{0.5}$) |
|---|---|---|---|---|---|---|
| 4 | 70/30 | 1900 | 2 | 96.4 | 485 | 4.98 |
| 5 | 30/70 | 1900 | 2 | 97.3 | 440 | 5.05 |
| 6 | 10/90 | 1900 | 2 | 95.4 | 355 | 4.80 |
| 7 | 100/0 | 1900 & 2000 | 2 & 0.5 | 99.1 | 423 | 5.02 |
| 8 | 0/100 | 1900 & 2000 | 2 & 0.5 | 98.4 | 491 | — |
| 9 | 90/10 | 1900 & 2000 | 2 & 0.5 | 98.9 | 538 | 5.04 |
| 10 | 70/30 | 1900 & 2000 | 2 & 0.5 | 99.1 | 600 | 5.35 |
| 11 | 30/70 | 1900 & 2000 | 2 & 0.5 | 99.1 | 532 | 5.31 |
| 12 | 10/90 | 1900 & 2000 | 2 & 0.5 | 98.6 | 573 | — |
| 13 | 100/0 | 1900 & 2050 | 2 & 0.5 | 98.9 | — | 5.19 |
| 14 | 0/100 | 1900 & 2050 | 2 & 0.5 | 97.8 | 432 | 4.14 |
| 15 | 90/10 | 1900 & 2050 | 2 & 0.5 | 98.8 | 499 | 4.93 |
| 16 | 70/30 | 1900 & 2050 | 2 & 0.5 | 99.0 | 562 | — |
| 17 | 30/70 | 1900 & 2050 | 2 & 0.5 | 98.7 | — | — |
| 18 | 10/90 | 1900 & 2050 | 2 & 0.5 | 98.7 | — | 5.17 |
| 19 | 100/0 | 1900 & 2100 | 2 & 0.5 | 98.5 | 383 | — |
| 20 | 0/100 | 1900 & 2100 | 2 & 0.5 | 95.3 | 493 | 5.46 |
| 21 | 90/10 | 1900 & 2100 | 2 & 0.5 | 98.3 | 533 | 5.95 |
| 22 | 70/30 | 1900 & 2100 | 2 & 0.5 | 98.2 | 547 | 6.04 |
| 23 | 30/70 | 1900 & 2100 | 2 & 0.5 | 97.7 | 507 | 5.90 |
| 24 | 10/90 | 1900 & 2100 | 2 & 0.5 | 97.0 | 542 | 5.67 |
| 25 | 100/0 | 1900 & 2150 | 2 & 0.5 | 97.6 | 410 | 5.03 |
| 26 | 0/100 | 1900 & 2150 | 2 & 0.5 | 93.6 | 415 | 4.64 |
| 27 | 90/10 | 1900 & 2150 | 2 & 0.5 | 97.9 | 537 | 5.28 |
| 28 | 70/30 | 1900 & 2150 | 2 & 0.5 | 97.6 | 532 | 6.02 |
| 29 | 30/70 | 1900 & 2150 | 2 & 0.5 | 97.2 | 499 | 5.86 |
| 30 | 10/90 | 1900 & 2150 | 2 & 0.5 | 96.3 | — | 5.10 |

What is claimed is:

1. A method for producing a sintered silicon carbide (SiC) body comprising the steps of:
   (a) preparing a raw batch containing:
   (i) a raw silicon carbide mixture containing about 30 to about 70 weight percent of an α-phase SiC powder and about 70 to about 30 weight percent of a β-phase SiC powder;
   (ii) aluminum oxide ($Al_2O_3$) powder, about 3 to 15 weight percent of said raw silicon carbide mixture;
   (iii) yttrium oxide ($Y_2O_3$) powder, about 2 to 10 weight percent of said raw silicon carbide mixture; and
   (iv) an organic binding agent and a dispersing agent;
   (b) drying said raw batch to form a dried green body;
   (c) heating said dried green body at temperatures between about 400° and 800° C. to remove said organic binding agent and said dispersing agent; and
   (d) subjecting said green body to a two-stage pressureless sintering process, first at a first sintering temperature between about 1,800° and about 1,950° C. for 0.5 to 8.0 hours, then at a second sintering temperature between about 1,900° and about 2,200° C. for 0.1 to 4 hours, wherein said second sintering temperature is selected such that it is higher than said first sintering temperature.

2. A method for producing a sintered silicon carbide body according to claim 1 wherein said step (a) of preparing said raw batch further comprises a sub-step of adding water to said raw batch so that said raw batch has a 35 to 65 weight percent solid content in water.

3. A method for producing a sintered silicon carbide body according to claim 1 wherein said α-phase SiC powder has an average size between 0.1 and 5.0 microns and said β-phase SiC powder has an average size between 0.01 and 3.0 microns.

4. A method for producing a sintered silicon carbide body according to claim 1 wherein said aluminum oxide powder has an average size between 0.1 and 3.0 microns and said yttrium oxide powder has an average size between 0.1 and 3.0 microns.

5. A method for producing a sintered silicon carbide body according to claim 1 wherein said dried green body has a density of at least 60% of its theoretical density.

6. A method for producing a sintered silicon carbide body according to claim 1 wherein said sintered silicon carbide body has a density of at least 94.5% of its theoretical density.

7. A method for producing a sintered silicon carbide body according to claim 1 wherein said two-stage sintering process comprises a first sintering stage at a first sintering temperature between about 1,800° and about 1,950° C., and a second sintering stage at a second sintering temperature between about 2,000° and about 2,200° C.

8. A method for producing a sintered silicon carbide body according to claim 1 wherein said two-stage sintering process comprises a first sintering stage at a first sintering temperature between about 1,800° and about 1,950° C. for between 1 and 4 hours, and a second sintering stage at a second sintering temperature between about 2,000° and about 2,200° C. for between 0.2 and 1 hour.

* * * * *